US009545675B2

(12) United States Patent
Childers, Jr. et al.

(10) Patent No.: US 9,545,675 B2
(45) Date of Patent: Jan. 17, 2017

(54) NONMETALLIC TOOLS FOR REMOVING FLEXIBILIZED EPOXY GAP FILLER MATERIALS, AND METHODS FOR REMOVING THE GAP FILLER MATERIALS

(71) Applicant: University of Dayton, Dayton, OH (US)

(72) Inventors: Paul K. Childers, Jr., Xenia, OH (US); Ryan P. Osysko, Troy, OH (US)

(73) Assignee: University of Dayton, Dayton, OH (US)

( * ) Notice: Subject to any disclaimer, the term of this patent is extended or adjusted under 35 U.S.C. 154(b) by 734 days.

(21) Appl. No.: 13/852,319

(22) Filed: Mar. 28, 2013

(65) Prior Publication Data

US 2013/0272809 A1    Oct. 17, 2013

Related U.S. Application Data

(60) Provisional application No. 61/616,757, filed on Mar. 28, 2012, provisional application No. 61/779,882, filed on Mar. 13, 2013.

(51) Int. Cl.
*B23C 3/12*    (2006.01)
*B23B 51/00*   (2006.01)
(Continued)

(52) U.S. Cl.
CPC .............. *B23B 51/00* (2013.01); *B23C 3/12* (2013.01); *B23C 5/10* (2013.01); *B23D 61/028* (2013.01); *B26D 3/00* (2013.01); *B23C 2215/04* (2013.01); *B23C 2226/27* (2013.01); *B23C 2226/61* (2013.01); *Y10T 83/04* (2015.04); *Y10T 83/7793* (2015.04); *Y10T 83/8789* (2015.04);
(Continued)

(58) Field of Classification Search
CPC ............ B23C 3/12; B23C 3/126; B23C 3/128; B23C 2215/04; B23C 2220/16; B23C 2220/20; B23C 2226/27; B23C 2226/37; B23C 2226/61
USPC ...... 409/131, 132, 138, 139; 407/53, 54, 119
See application file for complete search history.

(56) References Cited

U.S. PATENT DOCUMENTS 2,113,016 A * 4/1938 Demers .................. B44D 3/162
                                             29/DIG. 26
2,690,631 A * 10/1954 Peterson ................ B24D 13/00
                                                   15/180
(Continued)

FOREIGN PATENT DOCUMENTS

WO    WO 9629171 A1 * 9/1996 .............. B23C 3/00

OTHER PUBLICATIONS

Paul K. Childers; NonMetallic Rotary Gap Filler Removal Bit (slides from oral presentation given at 2012 Composites Manufacturing Conference in Mesa, Arizona; Mar. 13-15, 2012).

*Primary Examiner* — Daniel Howell
(74) *Attorney, Agent, or Firm* — Dinsmore & Shohl LLP

(57) ABSTRACT

Nonmetallic tools such as rotary bits, circular blades, and scything tools are described that may be suitable for removing cured flexibilized epoxy gap-filler materials from gaps between soft composite materials. The nonmetallic tools may be formed from various plastic or composite materials that are sufficiently hard to cut through the gap-filler material while being sufficiently soft to avoid damaging adjacent areas of soft composite materials. Methods for using the nonmetallic tools may include attaching the nonmetallic tools to a suitable machine-driven tool and contacting the nonmetallic tools to a material to be cut, shaped, or drilled.

10 Claims, 11 Drawing Sheets

(51) Int. Cl.
*B26D 3/00* (2006.01)
*B23D 61/02* (2006.01)
*B23C 5/10* (2006.01)

(52) U.S. Cl.
CPC ........ *Y10T 83/8798* (2015.04); *Y10T 83/9372* (2015.04); *Y10T 83/9454* (2015.04); *Y10T 408/65* (2015.01); *Y10T 409/303808* (2015.01)

(56) References Cited

U.S. PATENT DOCUMENTS

| | | | | | |
|---|---|---|---|---|---|
| 2,861,323 | A * | 11/1958 | Ebel | ............... | B44D 3/162 407/115 |
| 3,972,161 | A * | 8/1976 | Zoiss | ............... | B24B 33/086 407/119 |
| 4,891,887 | A * | 1/1990 | Witte | ............... | B23Q 11/0053 30/353 |
| 5,655,861 | A * | 8/1997 | Bardeen | ............... | B26F 1/16 30/358 |
| 5,839,897 | A * | 11/1998 | Bordes | ............... | A61B 17/1615 408/144 |
| 5,865,571 | A * | 2/1999 | Tankala | ............... | B23B 31/005 408/1 R |
| 5,983,434 | A * | 11/1999 | Eichinger | ............... | B24D 13/145 15/179 |
| 6,475,065 | B1 * | 11/2002 | Holmes | ............... | B23C 5/10 451/28 |
| 6,761,227 | B1 * | 7/2004 | Messer | ............... | A01B 1/065 172/21 |
| 7,322,776 | B2 * | 1/2008 | Webb | ............... | B23B 27/145 407/113 |
| 7,632,275 | B2 * | 12/2009 | Williams, III | ............... | A61B 17/1615 408/227 |
| 2010/0054880 | A1 * | 3/2010 | Ray | ............... | B27G 15/00 408/1 BD |

* cited by examiner

NONMETALLIC TOOLS FOR REMOVING FLEXIBILIZED EPOXY GAP FILLER MATERIALS, AND METHODS FOR REMOVING THE GAP FILLER MATERIALS

CROSS-REFERENCES TO RELATED APPLICATIONS

This application claims the benefit of priority under 35 U.S.C. §119(e) to U.S. Provisional Application Ser. No. 61/616,757, filed Mar. 28, 2012, and also claims the benefit of priority under 35 U.S.C. §119(e) to U.S. Provisional Application Ser. No. 61/779,882, filed Mar. 13, 2013, both of which applications are incorporated herein by reference in their entireties.

STATEMENT REGARDING FEDERALLY SPONSORED RESEARCH OR DEVELOPMENT

This invention was made with government support under contracts FA8650-05-D-5610 and FA8650-11-D-5610, Task Orders 0002 and 0011, awarded by The Air Force Research Laboratories, Materials Integrity Branch (AFRL/RXSA). The government has certain rights in the invention.

TECHNICAL FIELD

The present specification relates to nonmetallic cutting tools and, more particularly to nonmetallic cutting tools for removing flexibilized epoxy gap filler materials and to methods for removing the gap-filler materials.

BACKGROUND

Cutting tools such as drills, saw blades, and common scything tools, for example, in general should have an appropriate hardness and cutting surface configuration to avoid damaging the material being cut. For example, it is well known that drill bits that may be appropriate for drilling holes into wood or metal may not be appropriate for drilling into soft plastics, because the drill bits for the wood or metal will cause significant damage or cracking to portions of the plastic extending away from the hole being drilled.

In many applications, cutting tools must be tailored for compatibility with both the material being cut and the materials adjacent to the material being cut. One example of such an application is found in the aircraft industry, particularly for aircraft made of soft composite materials. In aircraft maintenance, gap-filler materials such as a flexiblized epoxy resin may be used to fill gaps between edges of composite or non-metallic panels and components. To remove old gap-filler material in preparation for maintenance or to remove excess gap-filler material during or after the maintenance, typically hand tools such as spud bars or scrapers are used. While these tools are labor-intensive, they are generally required as a gentler alternative to machine-driven tools, because aircraft materials such as carbon, fiberglass-reinforced epoxy, bismaleimide, and polyimide, for example, are very easily damaged. As such, there remain ongoing needs for cost-effective, efficient, and less labor-intensive tools, particularly tools that can be machine-driven, for removing gap-filler materials from gaps between soft materials.

SUMMARY

Against the above background, embodiments described herein are directed to nonmetallic tools, systems including the nonmetallic tools, and methods for using the nonmetallic tools.

According to some embodiments, a nonmetallic tool may include a cutting edge that removes flexibilized epoxy gap-filler material from a gap between composite materials when the nonmetallic tool is rotated or oscillated in contact with the flexibilized epoxy gap-filler material. The nonmetallic tool may be formed of a polyamide-polyimide based material having a hardness between a filler hardness of the flexibilized epoxy gap-filler material and a composite hardness of the composite materials.

According to further embodiments, systems for the removal of flexibilized epoxy gap-filler material from a gap between composite materials may include a nonmetallic tool and a power instrument. The nonmetallic tool may have a cutting edge. The nonmetallic tool may be formed of a polyamide-polyimide based material having a hardness between a filler hardness of the flexibilized epoxy gap-filler and a composite hardness of the composite materials. The power instrument may be adapted to rotate or oscillate the nonmetallic tool and cause the cutting edge to break up the flexibilized epoxy gap-filler material.

According to further embodiments, methods for removing a flexibilized epoxy gap-filler material from a gap between composite materials may include connecting a nonmetallic tool having a cutting edge to a power instrument adapted to rotate the nonmetallic tool. The nonmetallic tool may be formed of a polyamide-polyimide based material having a hardness between a filler hardness of the flexibilized epoxy gap-filler and a composite hardness of the composite materials. The methods may further include activating the power instrument to cause the nonmetallic tool to rotate or oscillate. The methods may further include contacting the cutting edge of the nonmetallic tool to the flexibilized epoxy gap-filler material while the nonmetallic tool is rotating or oscillating to break up the gap-filler material.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figures 1A, 1B:
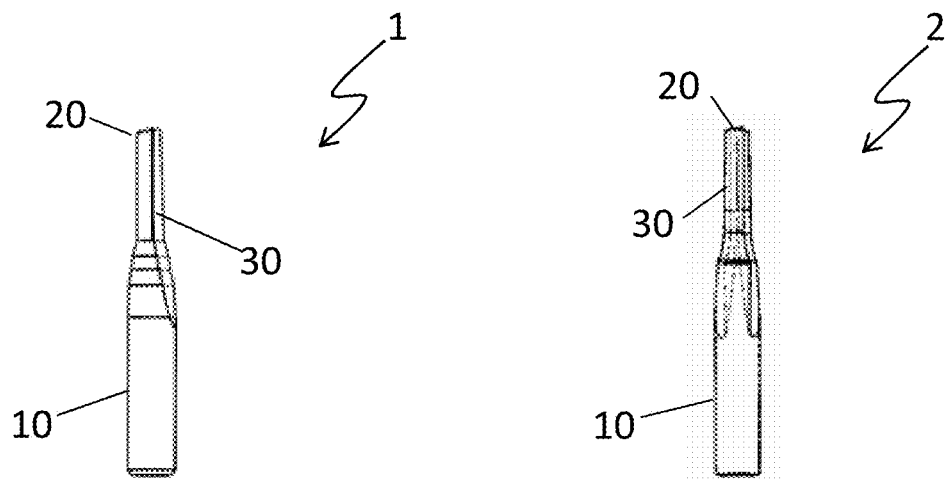
FIGS. 1A-1D illustrate various rotary bits, as embodiments of nonmetallic tools described herein.

Flexibilized epoxies belong to a class of materials having many uses, among which are the filling of gaps and seams in or between aircraft components, for example. The flexibilized epoxies contain mixture of an epoxy resin and an additive that imparts flexibility to the epoxy resin, thereby affording to the cured flexibilized epoxy both the high bonding strength of epoxies in general and also a degree of flexibility not typically recognized from epoxies. The flexibilized epoxies have numerous applications, including in the aircraft industry, for which exposure of components to forces and turbulence during flight necessitates at least some flexibility of joints and seams to maintain structural integrity of the aircraft. On modern aircraft, fiber composites such as composites of graphite and epoxy or composites of fiberglass, epoxy, and bismaleimide (BMI) are used to form structural components such as panels and skins for aircraft bodies and wings. The flexibilized epoxies may be used to fill joints or gaps between such components to provide to the joints or gaps both the strength of the epoxy and a flexibility of the flexibilized epoxy. Thereby, the component can move or flex in the turbulent conditions to which the aircraft may be subjected during flight without causing the flexibilized epoxy in the joints or gaps to crack.

During routine maintenance of flexibilized epoxy joints or gaps, old flexibilized epoxy must be removed to provide a clean surface to which new flexibilized epoxy may be applied. However, because the composite-type components surrounding the flexibilized epoxy tend to be relatively soft materials (compared to metals, for example), common metal tools are prone to damage the components if they are used to remove the flexibilized epoxy from the gaps between the components. Nonmetallic tools according to embodiments herein address this issue, in that the nonmetallic tools are made from nonmetallic materials having a hardness greater than that of the flexibilized epoxy to be removed yet less than that of the components surrounding the flexibilized epoxy.

Nonmetallic tools will be now be described with reference to the figures. Systems incorporating the nonmetallic tools and methods for using the nonmetallic tools will be described below.

In various embodiments, nonmetallic tools are provided. A nonmetallic tool may include a cutting edge that removes flexibilized epoxy gap-filler material from a gap between composite materials when the nonmetallic tool is rotated or oscillated in contact with the flexibilized epoxy gap-filler material. In some embodiments, the nonmetallic tool may be formed of a polyamide-polyimide based material having a hardness between a filler hardness of the flexibilized epoxy gap-filler material and a composite hardness of the composite materials. In preferred embodiments, the polyamide-polyimide based material may be a composite of a polyamide-polyimide resin and glass fibers. As an illustrative non-limiting example, the composite of the polyamide-polyimide resin and the glass fibers may contain about 70% by weight of the polyamide-polyimide resin and about 30% by weight of the glass fibers. Additional preferred materials will be described in greater detail below.

According to some embodiments, the nonmetallic tool may be any tool having a cutting edge. In non-limiting illustrative embodiments the nonmetallic tool may be a rotary bit, a circular blade, a blade for an oscillating tool, or a scything tool, for example.

In some embodiments, the nonmetallic tool may be a rotary bit. The rotary bits that may be suitable for removing cured or uncured gap-filler materials such as flexible epoxy resins. The rotary bits include a shank end and a cutting end. The shank end may be adapted to fit into a power instrument such as a mechanical tool, particularly a rotary tool such as a fixed-base milling machine or a hand-held drill, die grinder, or router. The cutting end may be configured with a suitable cutting profile that enables the rotary bit to cut into and/or remove gap-filler material from a narrow gap when the rotary bit is rotated with by the mechanical tool, for example.

Figures 1C, 1D:
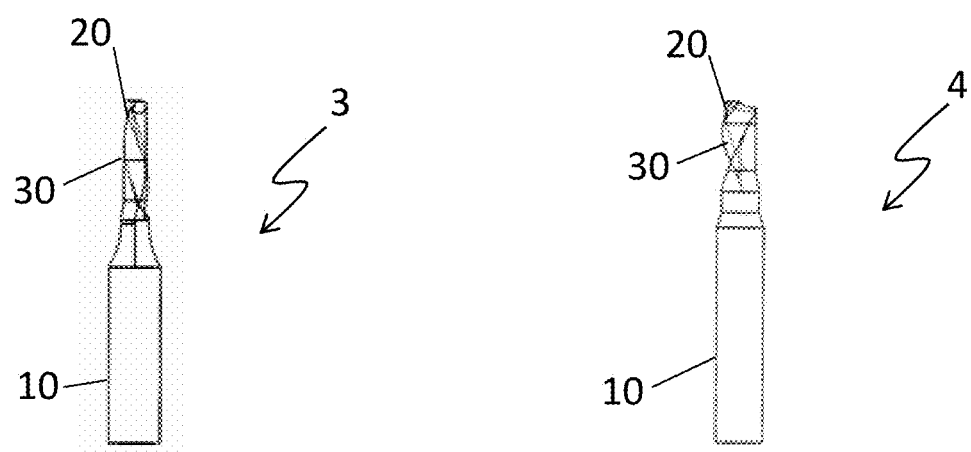

Exemplary rotary bits are shown in FIGS. 1A-1D. Each exemplary rotary bit has a cutting contour that is capable of removing the flexibilized gap-filler material. In FIG. 1A, a single-fluted bit 1 is shown. The single-fluted bit 1 includes a shank end 10 and a cutting end 20. A cutting edge 30 of the single-fluted bit 1 runs from the cutting end 20 along the side of the single-fluted bit 1. In FIG. 1B, a double-fluted bit 2 is shown. The double-fluted bit 2 includes a shank end 10 and a cutting end 20. A cutting edge 30 of the double-fluted bit 2 runs from the cutting end 20 along the side of the double-fluted bit 2. In FIG. 1C, a long-ended single-fluted spiral bit 3 is shown. The long-ended single-fluted spiral bit 3 includes a shank end 10 and a cutting end 20. A cutting edge 30 of the long-ended single-fluted spiral bit 3 runs from the cutting end 20 along the side of the long-ended single-fluted spiral bit 3. In FIG. 1D, a short-ended single-fluted spiral bit 4 is shown. The short-ended single-fluted spiral bit 4 includes a shank end 10 and a cutting end 20. A cutting edge 30 of the short-ended single-fluted spiral bit 4 runs from the cutting end 20 along the side of the short-ended single-fluted spiral bit 4. In preferred embodiments, angles and dimensions of the fluting and other features of the rotary bits of FIGS. 1A-1D may be optimized for use with flexibilized epoxy gap-filler materials.

Rotary bits such as those shown in FIGS. 1A-1D may be suitable for removing gap-filler materials, such as flexible epoxy resins, or other sealant materials typically used in aircraft maintenance. Preferably, the gap-filler materials can be removed without damaging fragile aircraft materials such as carbon or fiberglass, for example, the gaps between which the gap-filler materials have been used. To provide both the necessary gap-filler material removing capability and the ability to protect the fragile aircraft materials, the rotary bits may be constructed of high-performance plastic materials. The plastic materials may be less damaging than common rotary bits made of metal, for example.

Figure 2A:
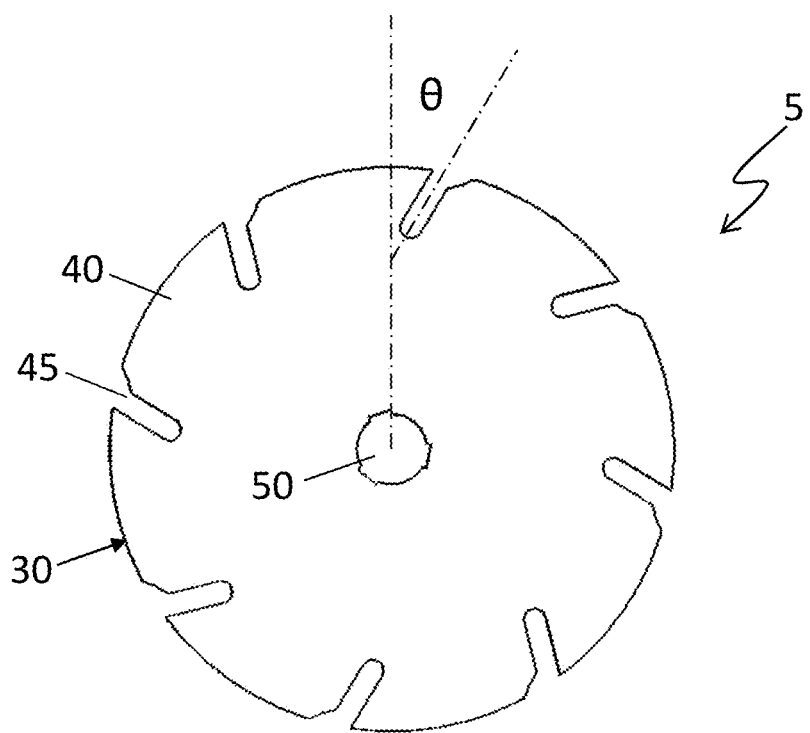
FIG. 2A illustrates a circular blade with angled teeth as an embodiment of nonmetallic tools described herein.
Figure 2B:
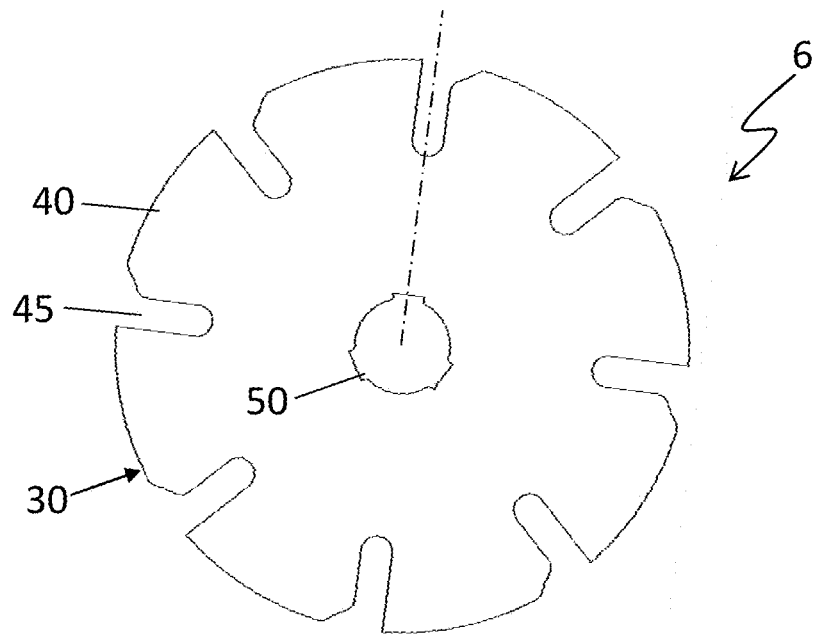
FIG. 2B illustrates a circular blade with radially-aligned teeth as an embodiment of nonmetallic tools described herein.

In further illustrative embodiments, the nonmetallic tools suitable for removing flexibilized resin gap filler materials may include circular blades. Referring to FIGS. 2A and 2B, the nonmetallic tools may include circular blades adapted to be used in a power cutting tool. For example, the angled-tooth circular blade 5 of FIG. 2A includes a cutting edge 30 around a circumference of the angled-tooth circular blade 5. The cutting edge 30 includes a number of blade teeth 40. Tooth gaps 45 between the blade teeth 40 may be angled at an angle θ from the radius of the angled-tooth circular blade 5. As shown, the angle θ is about 20°, but any suitable angle may be used. The radial-tooth circular blade 6 of FIG. 2B also includes a cutting edge 30. The cutting edge includes a number of blade teeth 40, each of which is aligned with the radius of the radial-tooth circular blade 6. Both the angled-tooth circular blade 5 of FIG. 2A and the radial-tooth circular blade 6 of FIG. 2B include a tool adapter hole 50 that enables the blade to be attached to a power instrument such as a circular saw, for example. It should be understood that the embodiments shown in FIGS. 2A and 2B are meant to be illustrative of geometries suitable for use as the circular blades and that numerous other geometries are possible.

In some illustrative embodiments, high-performance plastics well suited for constructing the nonmetallic tools, including the rotary bits and circular blades described above, may include, without limitation, FEP (fluorinated ethylene propylene), PFA (perfluoroalkoxy), PEEK (polyether ether ketone), PEKK (polyether ketone ketone), PEI (polyether imide), PIA (purified isophthalic acid), TPI, PBI (polybenzimidazole), PAI (polyamide imide), LNP thermocomp compounds containing carbon fibers, and proprietary blends such as EXTEM®, TORLON® (a PAI), and UTEM® (a PEI). Optionally, as additives one or more fillers such as glass fibers, glass powders, carbon fibers, carbon powders, carbon nanomaterials, and ceramics such as alumina may be added to the high-performance plastic material. The additives may improve physical characteristics such as tensile strength, flexural strength, tensile and/or flexural modulus, thermal properties, and density and friction/wear resistance. The additives may be added to the high-performance plastics at a level of from 0 wt. % to about 50 wt. %, based on the combined weight of the plastic and the additive to form a base material.

In exemplary embodiments, nonmetallic tools may be made by any suitable process for molding or shaping plastic materials. For example, the rotary bits described above with reference to FIGS. 1A-1D may be made by injection molding or other suitable technique. For example, the rotary bits may be made by injection molding of a material such as the TORLON® family of polyamide-polyimide resins.

One preferred Torlon® resin for use in the nonmetallic tools, including the rotary bits, is TORLON® 5030, a polyamide-polyimide resin available from Solvay Specialty Polymers and including 70% polymer by weight and 30% glass fiber reinforcement by weight, based on the total weight of the resin. TORLON® 5030 is available as a high-flow formulation (TORLON® 5030-HF), a low flow formulation (TORLON® 5030-LF), and an extrusion grade (TORLON® 5030-E), of which the high-flow formulation may be preferred in some embodiments for injection molding of the rotary bits described herein. TORLON® 5030 has a Rockwell hardness of about 94, measured according to ASTM D785, and is significantly harder than typical flexibilized gap-filler materials with a hardness of 80 to 95 on the Shore A scale used for flexible or elastomeric materials generally. Composite materials such as fiberglass laminates that are used in aircraft manufacture, for example, typically have Rockwell hardness values greater than 100 or greater than 110, as measured according to ASTM D785.

One suitable manufacturing method for the nonmetallic tools such as the rotary bits and the circular blades is injection molding. A mold cast may be made of a non-adherent soft material such as room-temperature vulcanized (RTV) silicone rubber. The base materials described above may be added to such molds by any suitable process such as injection molding, for example, to form the nonmetallic tools substantially as depicted in FIGS. 1A-1D and 2A-2B. Suitable materials for the mold casts may include Mold-Max® 30 Performance RTV silicone rubber, Smooth-Cast® 300 Series Liquid Plastic (an ultra-low viscosity casting resin), and TASK® 8 heat-resistant urethane plastic. On a larger scale, the nonmetallic tools may be manufactured by an injection mold. For example, to manufacture rotary bits, multiple cavities may be arranged to produce more than one rotary bit at one time.

Series of rotary bits of different materials were made by an injection molding apparatus. The rotary bits were inserted into a DOTCO® model 12L1281-36 (20,000 rpm) 90° hand grinder connected to an inline air regulator and were used to test the effectiveness of the rotary bits for removing gap-filler materials and the durability of the rotary bits themselves. It was noted that single-fluted and double-fluted straight bits required careful technique for inserting the rotary bits into gap joints. Possibly due to a non-symmetrical cutting surface, at low to moderate psi the bit would chatter, breaking the single-fluted and double-fluted bits at the transition between the fluted portion and the bit shank.

Figure 3:
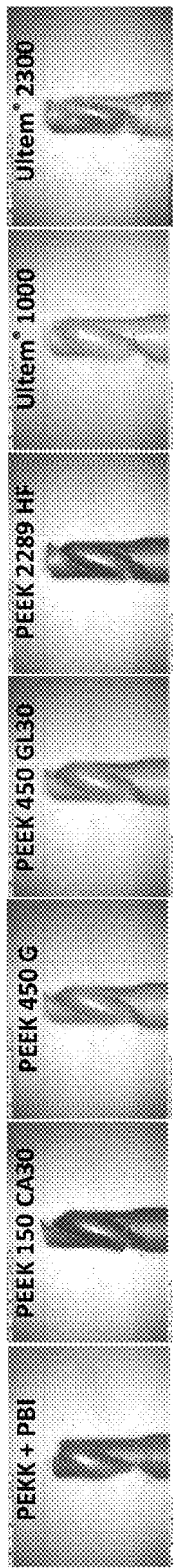
FIG. 3 depicts rotary bits made of various nonmetallic materials before and after testing by removal of flexibilized epoxy gap-filler materials.
Figure 3:
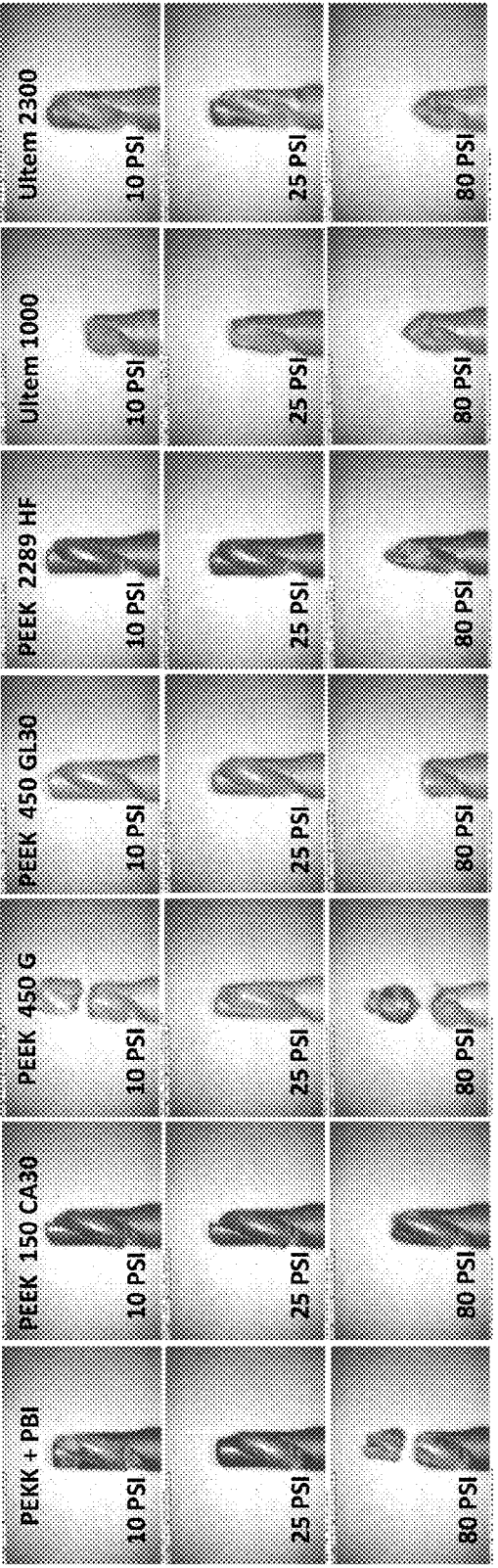

A selection of rotary bits were tested by constructing a 12"×12"×0.50" carbon/epoxy laminate with eight 12"× 0.250"×0.250" machined grooves. The grooves each were filled with a gap-filling compound (a flexible epoxy resin commonly used for aircraft maintenance), which was allowed to cure. The laminate was divided into three equal sections to provide eight 4" grooves filled with cured filling material, for a total of 24 test grooves. Various line pressures, as measured by the inline air regulator described above were used during the tests to regulate rotational speed of the rotary bits. A first section used a line pressure of 10 psi (equivalent to about 5,200 rpm); a second section used a line pressure of 80 psi (equivalent to about 7,600 rpm); and a third section used a line pressure of 25 psi (equivalent to about 6,400 rpm). The bit materials tested were ULTEM® 1000 and 2300, PEKK+PBI, and four PEEK materials: 450G, 450GL30, 150CA30, and 2289 HF. Conditions of the rotary bits both before and after the preliminary testing are shown in FIG. 3.

Based on performance in the preliminary testing, four materials were chosen for further tests: PEEK 150CA30, PEEK 450GL30, PEEK 2289 HF, and ULTEM® 2300. Additional materials that were tested included: LNP Thermocomp EC006, LNP Thermocomp EC008PXQ, TOR-LON® 4275, TORLON® 4301, and TORLON® 5030. The further testing used a line pressure of 25 psi and two types of filler material: one having a Shore A hardness of 89, and another having a Shore A hardness of 83.

Figure 4:
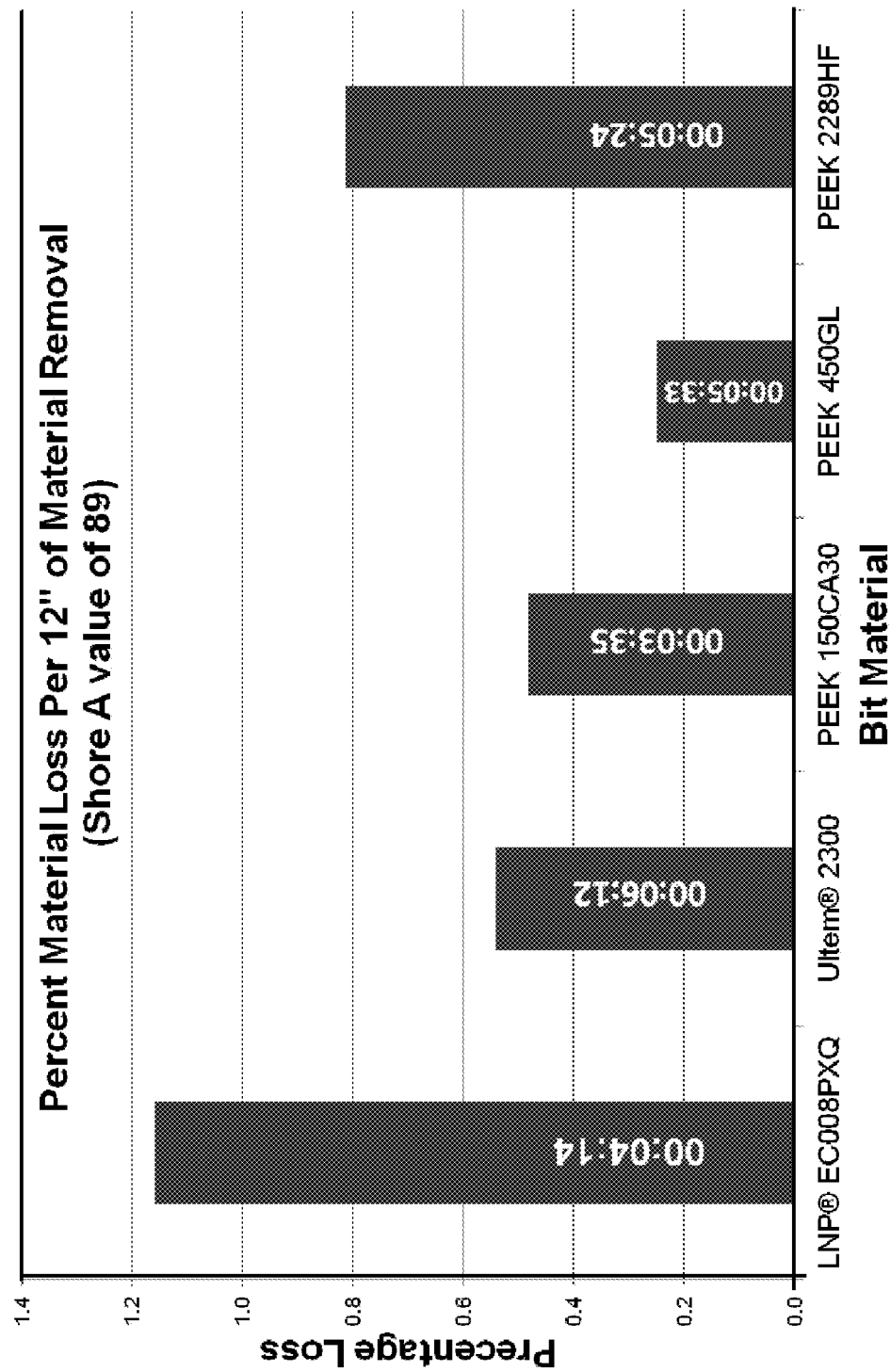
FIG. 4 is a graph showing amount of material lost by selected rotary bits of FIG. 3 during the testing by removal of flexibilized epoxy gap-filler materials having a Shore A hardness of 89.
Figure 5:
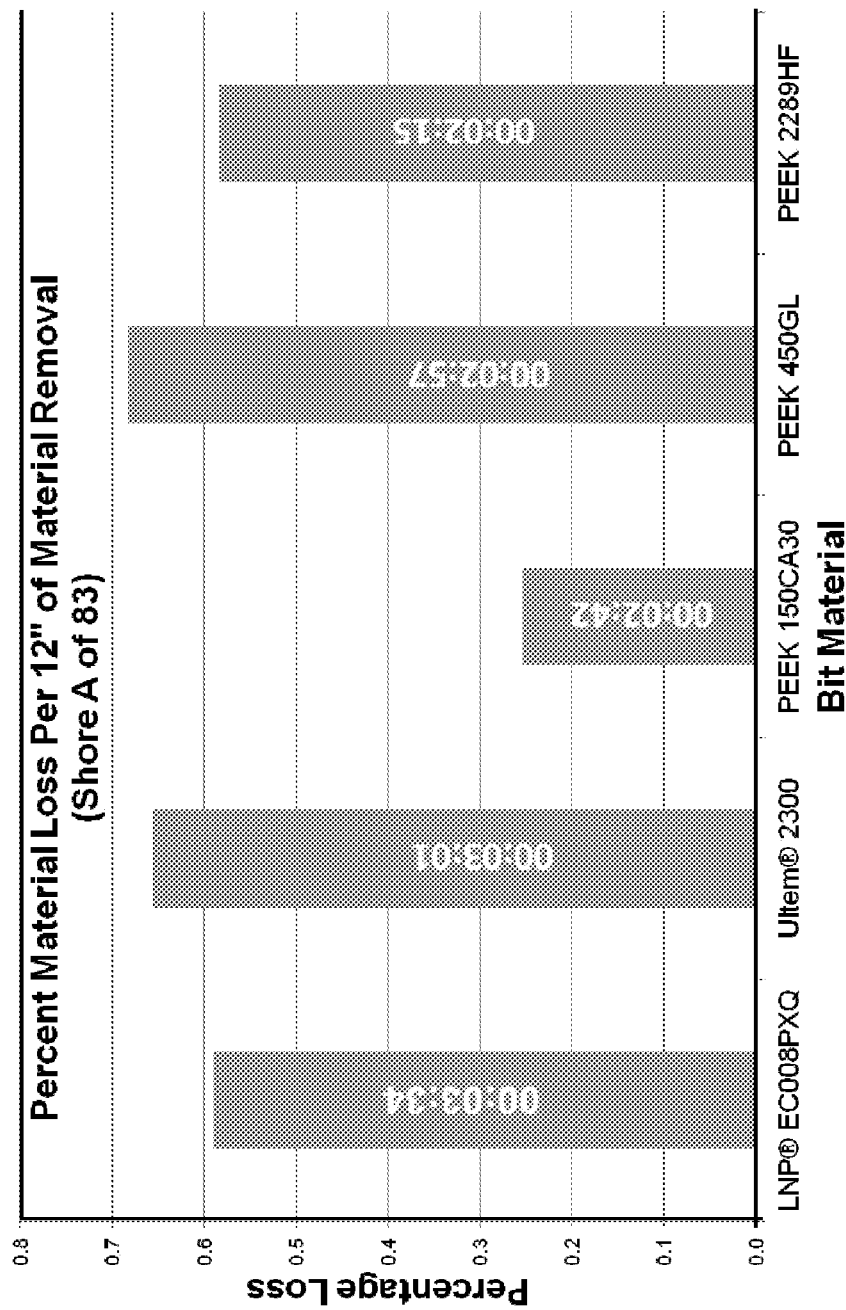
FIG. 5 is a graph showing amount of material lost by selected rotary bits of FIG. 3 during the testing by removal of flexibilized epoxy gap-filler materials having a Shore A hardness of 83.

The graphs in FIGS. 4 and 5 show the performance of the various rotary bit materials in the further testing. In particular, the graphs illustrate the percent of the material of the rotary bit that was lost after removal of a 12"-long portion cured gap-filler from the test gap described above. FIG. 4 shows the results from Shore A 89 gap-filler material, and FIG. 5 shows the results from the Shore A 83 gap-filler material. The time required to remove the 12" portion is shown on the bars of the graphs. In these graphs, superior performance of the rotary bits is shown by a smaller percentage loss.

Figure 6:
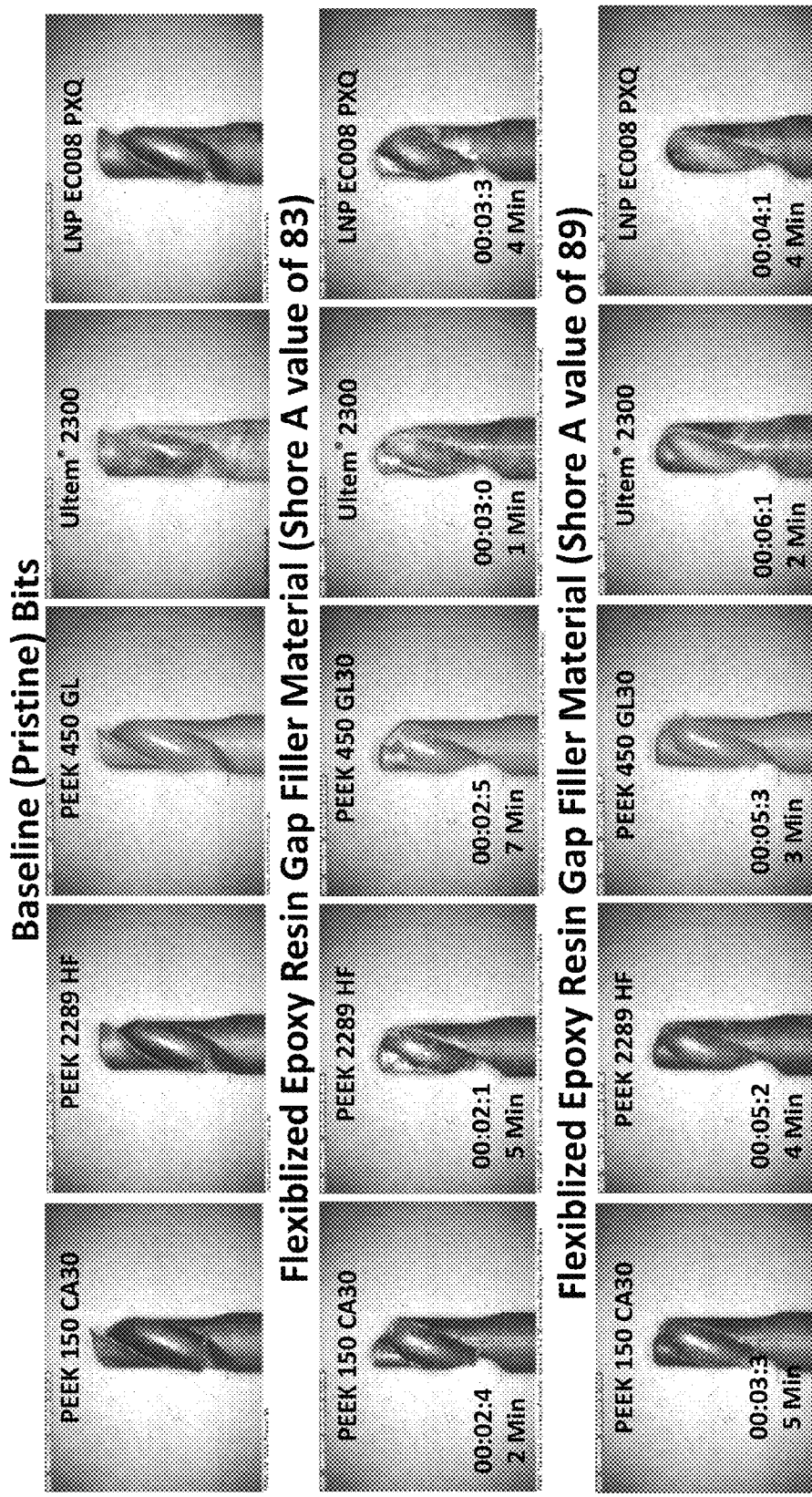
FIG. 6 depicts rotary bits made of various nonmetallic materials before and after testing by removal of flexibilized epoxy gap-filler materials with Shore A hardness values of 83 and 89.
Figure 7:
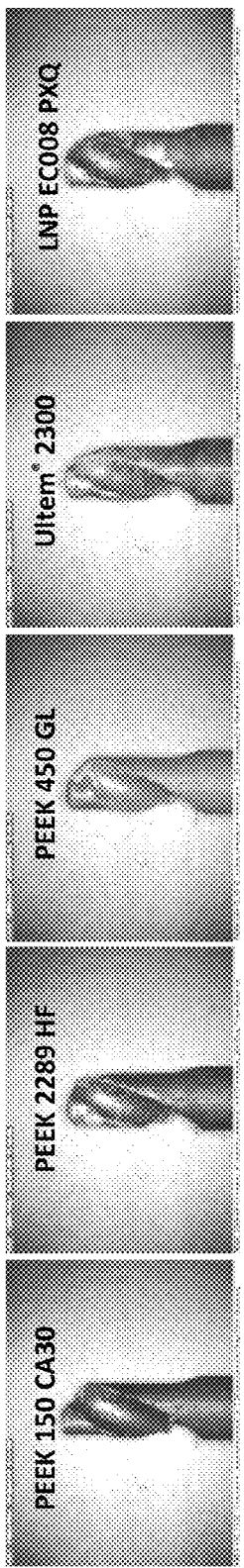
FIG. 7 depicts multiple views of the rotary bits of FIG. 6 after testing by removal of flexibilized epoxy gap-filler materials with Shore A hardness values of 83.
Figure 7:
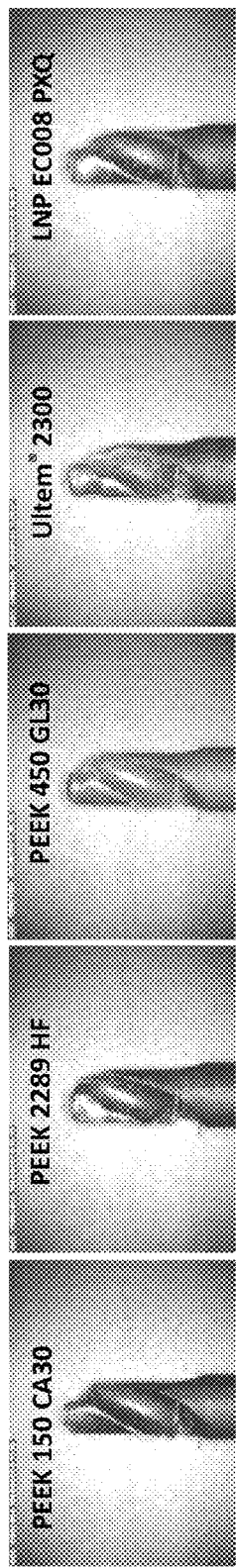
Figure 7:
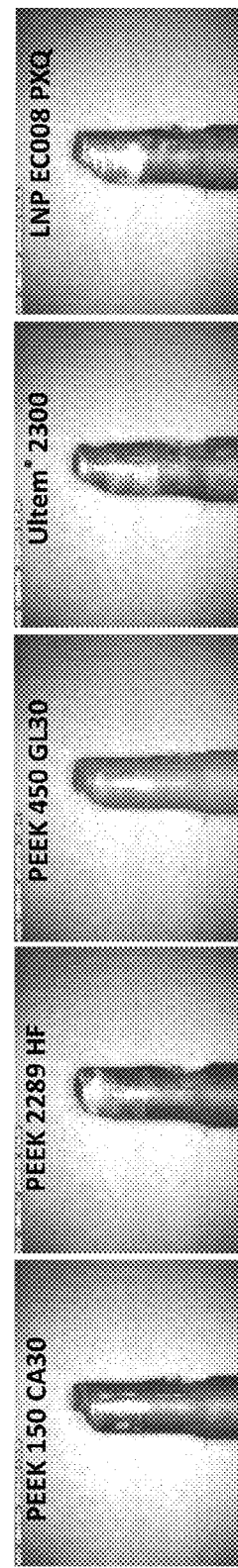
Figure 8:
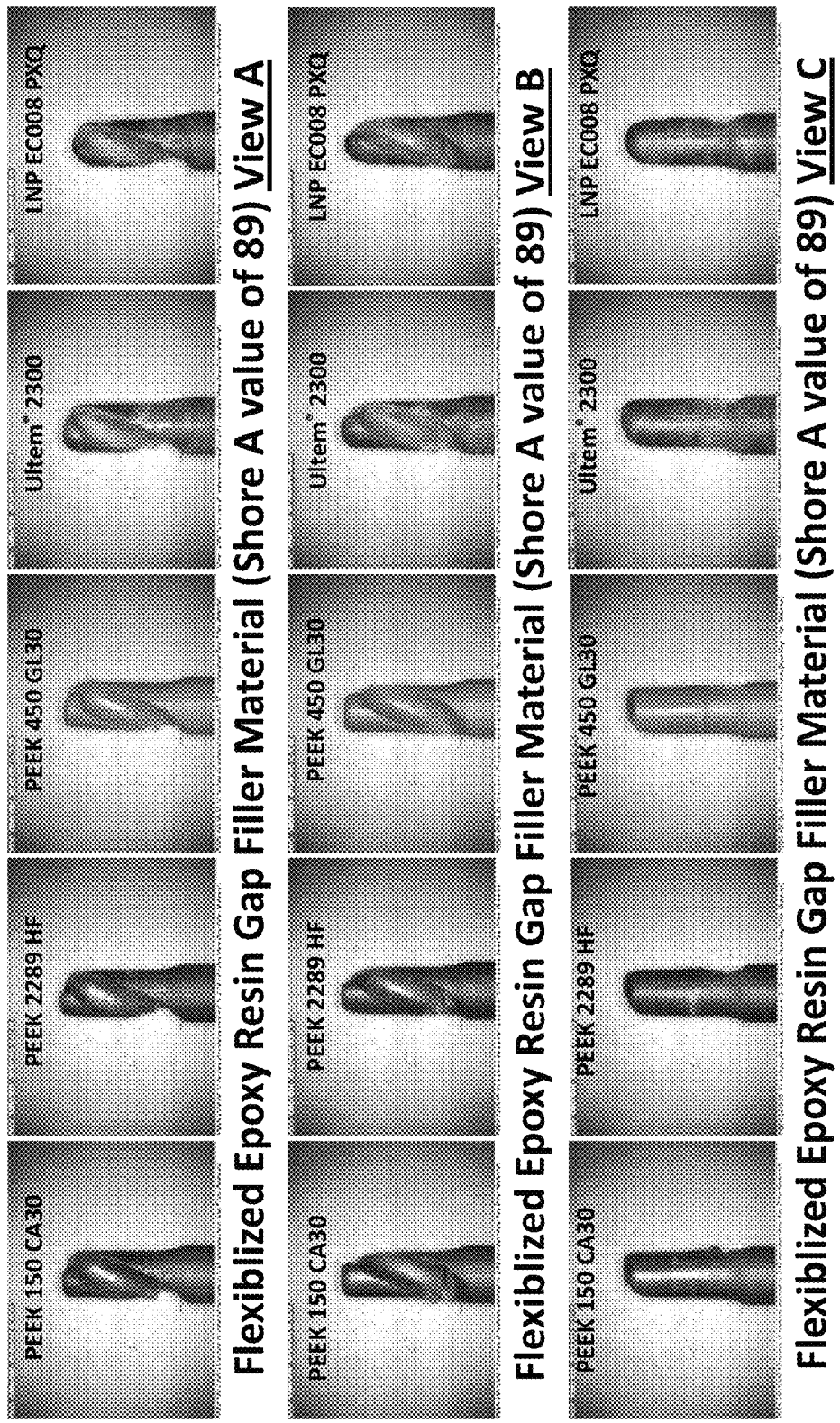
FIG. 8 depicts multiple views of the rotary bits of FIG. 6 after testing by removal of flexibilized epoxy gap-filler materials with Shore A hardness values of 89.
Figure 9:
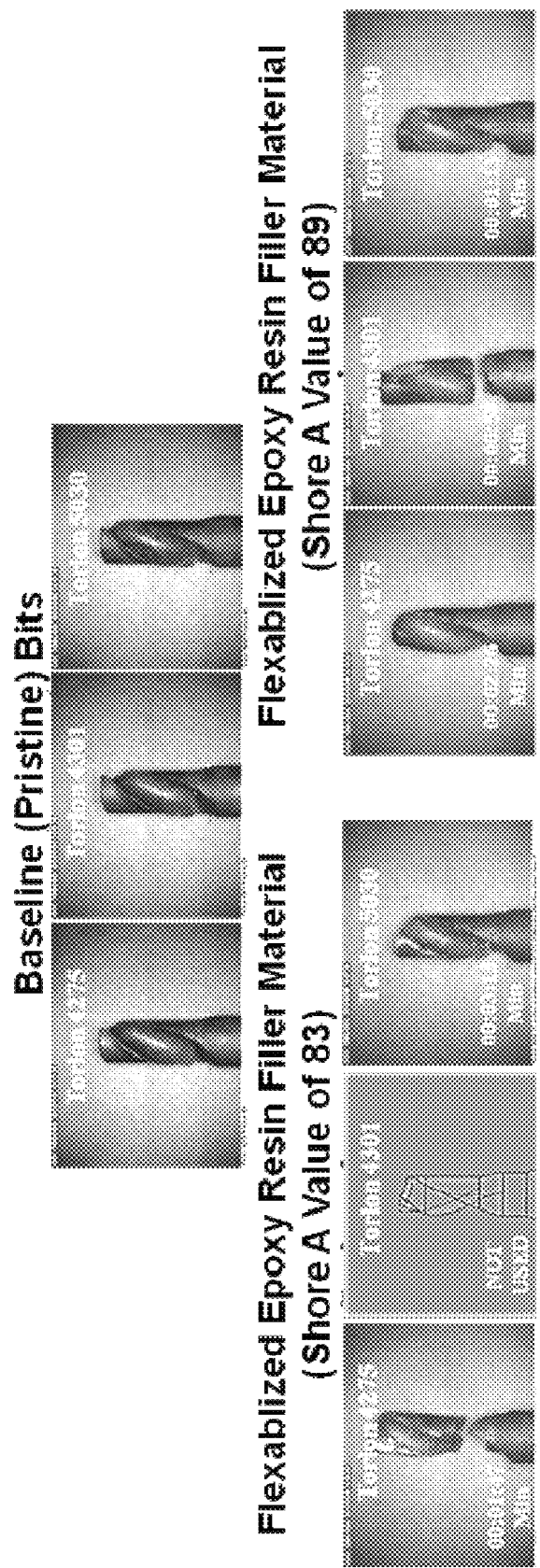
FIG. 9 depicts rotary bits made of TORLON® materials before and after testing by removal of flexibilized epoxy gap-filler materials with Shore A hardness values of 83 and 89.
Figure 10:
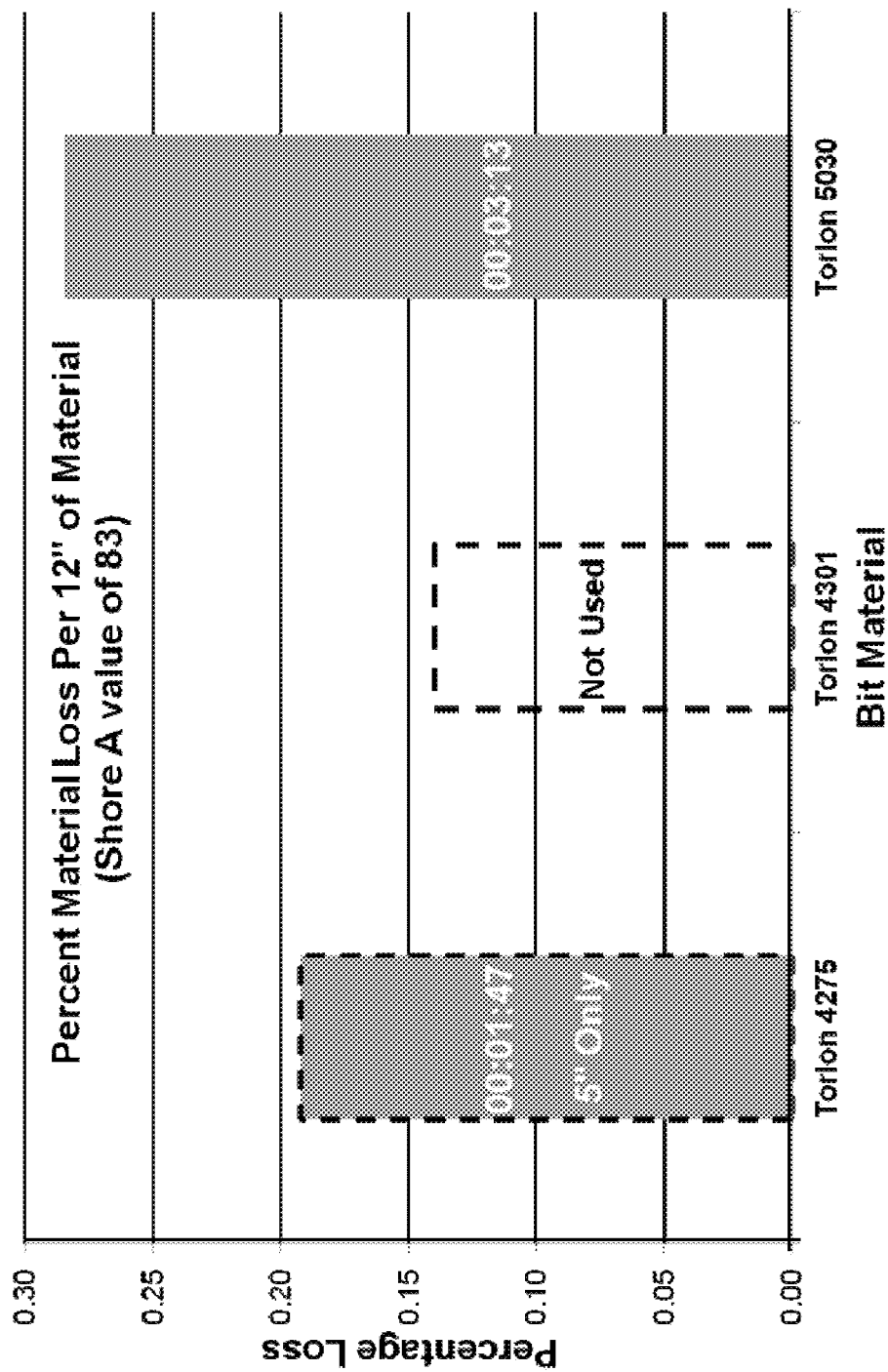
FIG. 10 is a graph showing amount of TORLON® material lost by selected rotary bits of FIG. 9 during the testing by removal of flexibilized epoxy gap-filler materials having a Shore A hardness of 83.
Figure 11:
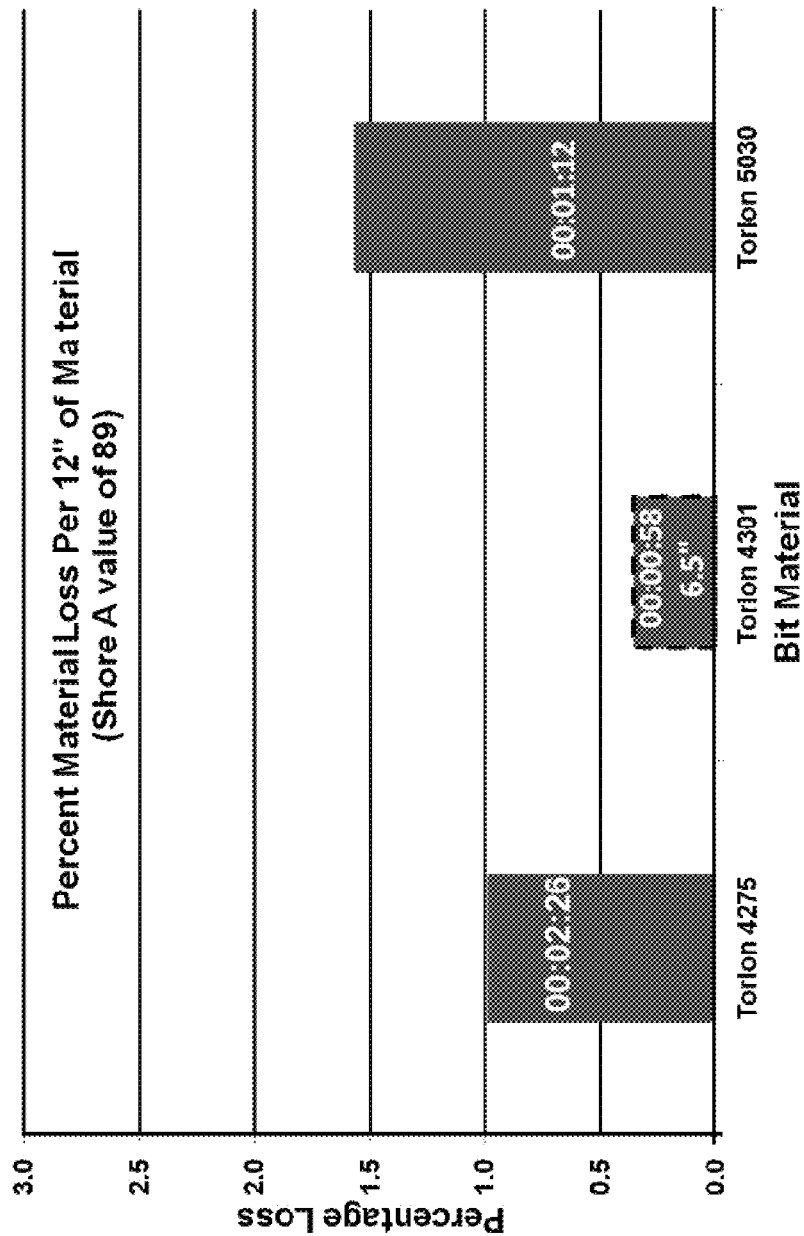
FIG. 11 is a graph showing amount of TORLON® material lost by selected rotary bits of FIG. 9 during the testing by removal of flexibilized epoxy gap-filler materials having a Shore A hardness of 89.

Pictorial representations of the rotary bits having data summarized in FIGS. 4 and 5 are provided in FIGS. 6-8. Pictorial representations of the Torlon® rotary bits are provided in FIG. 9, the test data being summarized in the graphs of FIGS. 10 and 11. Preliminary testing revealed that the rotary bits made of the TORLON® 5030 material provided a favorable level of material loss when removing gap filler material of both Shore A 83 hardness and Shore A 89 hardness. Moreover, after removal of the gap filler, the TORLON® 5030 rotary bits did not break and also retained a substantially higher level of their original cutting contours, compared to the rotary bits made of other materials.

In some embodiments, the circular blades may be formed from any of the nonmetallic materials described above with respect to the rotary bits. For example, the circular blades may be formed from TORLON® 5030 or other PAI-based material. In some embodiments, it may be preferable to form the circular blades from a plastic such as the TORLON® 5030, into which an additive is mixed before the circular blade is formed. For example, the circular blades may be formed from TORLON® 5030 with a quartz or fiberglass additive such as Astroquartz III (a silica fiber quartz fabric available from JPS Composite Materials).

In other embodiments, in addition to the rotary bits and the circular blades described above, the nonmetallic tools may include, without limitation, blades for oscillating tools such as the DREMMEL® (manufactured by the Robert Bosch Tool Corporation). Further examples of nonmetallic tools include hand scything tools such as chisels, knives, blades, planes, or gouges. Such additional tools may be formed or molded from any of the materials described herein with regard to the rotary bits and the circular blades. Each of the additional tools may include a cutting edge that removes flexibilized epoxy gap-filler material from a gap between composite materials when the nonmetallic tool is rotated or oscillated in contact with the flexibilized epoxy gap-filler material. In illustrative embodiments, any of the additional tools may be made, formed, or molded from TORLON® 5030 or other similar PAI materials.

Any of the nonmetallic tools described above may be incorporated into a system for removal of flexibilized epoxy gap-filler material from a gap between composite materials. Exemplary systems may include the nonmetallic tool having a cutting edge. In some embodiments, the nonmetallic tool may be formed of a polyamide-polyimide based material having a hardness between a filler hardness of the flexibilized epoxy gap-filler and a composite hardness of the composite materials. The systems may further include a power instrument adapted to rotate or oscillate the nonmetallic tool and cause the cutting edge to break up the flexibilized epoxy gap-filler material. Common power tools may be used as the power instrument, and the nonmetallic tools may have any suitable adaptation to according to the mechanical structure of the power instrument. For example, a rotary bit may have a shank end that fits into the end of a drill such as a pneumatic drill, and a circular blade may have a tool adapter hole in its center, such that the circular blade is spun by a power instrument such as a circular saw. Scything tools may have similar adaptations for use in rotary or oscillatory power instruments. In some embodiments, the systems may further include a dust-collector assembly for removing dust generated by the nonmetallic tool as the flexibilized epoxy gap-filler material is removed.

The nonmetallic tools or the systems including the nonmetallic tools may be used in various methods for removing a flexibilized epoxy gap-filler material from a gap between composite materials. In some embodiments, methods for removing the flexibilized epoxy gap-filler material may include connecting a nonmetallic tool having a cutting edge to a power instrument adapted to rotate the nonmetallic tool. The nonmetallic tool may be any of the nonmetallic tools described above. In some embodiments, the nonmetallic tool may be formed of a polyamide-polyimide based material having a hardness between a filler hardness of the flexibilized epoxy gap-filler and a composite hardness of the composite materials. The methods may further include activating the power instrument to cause the nonmetallic tool to rotate or oscillate. Then, the cutting edge of the nonmetallic tool may be contacted with the flexibilized epoxy gap-filler material while the nonmetallic tool is rotating or oscillating. Thereby, the gap-filler material may be broken up and removed without damaging the fragile composite materials adjacent to the gap.

In some embodiments of methods for removing the flexibilized epoxy gap-filler material, the polyamide-polyimide based material may be a composite of a polyamide-polyimide resin and glass fibers, such as a composite comprising about 70% by weight of a polyamide-polyimide resin and about 30% by weight glass fibers. In some embodiments, the nonmetallic tool may be a rotary bit, a circular blade, a blade for an oscillating tool, or a scything tool, for example.

In some embodiments of methods for removing the flexibilized epoxy gap-filler material, the nonmetallic tool may be rotated at a rotation speed of from about 3000 rpm to about 20,000 rpm, for example from about 4000 rpm to about 6000 rpm. In preferred methods, the composite materials may be carbon-fiber epoxy composites, graphite-fiber epoxy composites, fiberglass epoxy composites, fiberglass epoxy bismaleimide composites, or combinations thereof. For example, the composite materials may include aircraft components constructed from the composite materials. In especially preferred methods, the composite materials are not damaged while the flexibilized epoxy gap-filler material is removed.

The methods for using the nonmetallic tools described herein may therefor include removing flexibilized epoxy gap-fill materials from gaps, seams, or crevasses between two components. In some embodiments, the two components are aircraft components formed of a carbon-fiber composite, a graphite composite, or a fiberglass-epoxy BMI composite. The gap-filler materials typically may have a hardness of from about 80 Shore A to about 100 Shore A, such as 83 Shore A or 89 Shore A, for example. The nonmetallic tool may be a rotary bit, a circular blade, or any of the additional scything tools such as a chisel, a knife, a blade, a plane, or a gouge. In exemplary embodiments, the nonmetallic tools used in the methods may be made of TORLON® 5030 or other similar PAI-based material. The TORLON® 5030 or other similar PAI-based material may include additives such as glass or quartz fibers.

The methods for using the nonmetallic tools may include connecting the nonmetallic tool to a power instrument such as a rotary drill or saw; activating the power instrument to cause the nonmetallic tool to rotate at a speed such as from 3000 rpm to 20,000 rpm, for example; contacting a cutting face of the nonmetallic tool to flexibilized epoxy contained in a gap, seam, or crevasse between two components; and removing the flexibilized epoxy.

Thus, the present disclosure has described and demonstrated nonmetallic rotary bits that may be well suited for removal of gap-filler materials and/or sealant materials commonly used in applications such as aircraft maintenance. The nonmetallic rotary bits provide a solution to the time-consuming and labor-intensive requirements of using instruments such as scrapers. In particular, the nonmetallic rotary bits may provide a number of advantages. First, they are easy to drop into a machine tool such as a hand-held drill and, therefore, are easy to replace. Second, the nonmetallic rotary bits do not damage gaps in panels, substrates, paints, or primers during removal of the gap-filler material or the sealant material. Third, the nonmetallic rotary bits do not require sharpening and re-sharpening, as do the common scrapers. Fourth, the nonmetallic rotary bits may be mounted on straight or right-angle commercially-available pneumatic and battery operated drills and grinders operating at 4,000 rpm to 6,000 rpm, for example, which speeds can be adjusted by adjusting air supply. Fifth, the nonmetallic rotary bits are non-abrasive and, therefore, minimize the possibility of damage to topcoats, primers, or composite and metal aircraft components. Sixth, much unlike the known scraper tools, the nonmetallic rotary bits have a unique ability to enable plunge cutting into gap-filler materials. The ability to plunge cut may provide quick access to objects such as embedded rip cords that have been installed into access panels that are frequently removed, for example. Thus, the present disclosure should be understood to encompass any suitable apparatus, system, or method including a nonmetallic rotary bit described herein, or the use of the same, which could benefit from at least one of the above advantages.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

What is claimed is:

1. A method for removing a gap-filler material between two structural components each made of a composite material without damaging the structural components, wherein:
   the gap-filler material is a flexibilized epoxy having a filler hardness from about 80 Shore A to about 100 Shore A;
   the gap-filler material is disposed in a gap, joint, seam, or crevasse between the two structural components;
   the composite material of each structural component is selected from the group consisting of carbon-fiber epoxy composites, a graphite-fiber epoxy composites, fiberglass epoxy composites, fiberglass epoxy bismaleimide composites, and combinations thereof;
   the composite material of each structural component has a composite hardness greater than 100 on the Rockwell scale;
the method comprising:
   providing a nonmetallic tool having a cutting edge, the nonmetallic tool being formed of a polyamide-polyimide based material having a hardness greater than the filler hardness and less than the composite hardnesses of the structural components;
   connecting the nonmetallic tool to a power instrument adapted to rotate or oscillate the nonmetallic tool, the nonmetallic tool having a cutting edge;
   activating the power instrument to cause the nonmetallic tool to rotate or oscillate;
   contacting the cutting edge of the nonmetallic tool to the gap-filler material while the nonmetallic tool is rotating or oscillating to break up the gap-filler material; and
   removing the gap-filler material broken up by the nonmetallic tool from the gap, joint, seam, or crevasse between the two structural components.

2. The method of claim 1, wherein the polyamide-polyimide based material is a composite of a polyamide-polyimide resin and glass fibers.

3. The method of claim 1, wherein the nonmetallic tool is a rotary bit or a circular blade.

4. The method of claim 1, wherein the nonmetallic tool is rotated at a rotation speed of from about 3000 rpm to about 20,000 rpm when the cutting edge is contacted to the gap-filler material.

5. The method of claim 1, wherein the composite materials of the two structural components adjacent to the gap, joint, seam, or crevasse are not damaged while the gap-filler material is removed.

6. The method of claim 1, wherein:
   the nonmetallic tool is selected from the group consisting of a rotary bit, a circular blade, a blade for an oscillating tool, and a scything tool
   the nonmetallic tool consists essentially of the polyamide-polyimide based material;
   the polyamide-polyimide based material is selected from the group consisting of an injection molded polyamide-polyimide resin and an injection-molded composite of a polyamide-polyimide resin and glass or quartz fibers.

7. The method of claim 6, wherein the polyamide-polyimide based material is an injection-molded composite of a polyamide-polyimide resin and glass fibers.

8. The method of claim 7, wherein the injection-molded composite consists of about 70% by weight of the polyamide-polyimide resin and about 30% by weight of the glass fibers.

9. The method of claim 6, wherein the nonmetallic tool is a rotary bit and the power instrument is a pneumatic drill.

10. The method of claim 6, wherein the nonmetallic tool is a circular blade and the power instrument is a circular saw.

* * * * *